UNITED STATES PATENT OFFICE 2,565,859

1,4-BIS(TRICHLOROMETHYL)-2,3 DIARYL BUTANES

Elbert C. Ladd, Passaic, and Herbert Sargent, Woodridge, N. J., assignors to United States Rubber Company, New York, N. Y., a corporation of New Jersey No Drawing. Application January 19, 1948, Serial No. 3,174

6 Claims. (Cl. 260—613)

This invention relates to new chemicals designated 1,4-bis(trichloromethyl)-2,3-diarylbutanes. They subscribe to the formula

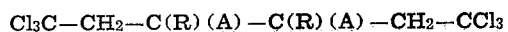

where R is hydrogen or alkyl; A is aryl, including substituted aryl (e. g., haloaryl, (e. g., p-chlorophenyl); polyhaloaryl (e. g., o,p-dichlorophenyl); alkaryl (e. g., tolyl, xylyl); alkoxyaryl (e. g., p-methoxyphenyl); carbonitrilo aryl (e. g., p-cyanophenyl)).

The chemicals can be prepared by the catalytic hydrogenation of arylbromotrichloromethylalkanes which subscribe to the formula

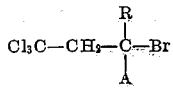

(in which R and A are as above defined).

The reaction is a reductive-type coupling reaction wherein the catalytic hydrogenation of the 1-trichloromethyl-2-bromo-2-arylalkane does not involve the trihalomethyl group but proceeds unexpectedly with the elimination of the bromine atom and formation of hexahaloalkanes, viz., symmetrical bis(trichloromethyl) diarylalkanes, as illustrated by the following equation

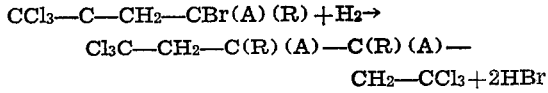

Exemplary of compounds which can be prepared by the coupling reaction of our invention are, among others, 1,4-bis(trichloromethyl)-2,3-diphenylbutane
1,4 - bis(trichloromethyl) - 2,3 - dimethyl - 2,3-diphenylbutane
1,4 - bis(trichloromethyl) - 2,3 - di - alpha-naphthylbutane
1,4 - bis(trichloromethyl) - 2,3 - di - beta-naphthylbutane
1,4 - bis(trichloromethyl) - 2,3 - di - p - tolyl-butane
1,4 - bis(trichloromethyl) - 2,3 - di(2,5) - xylyl-butane
1,4 - bis(trichloromethyl) - 2,3 - di(p - chloro-phenyl) butane
1,4 - bis(trichloromethyl) - 2,3 - bis(o,p - dichlo-rophenyl) butane
1,4 - bis(trichloromethyl) - 2,3 - di(p - methoxy-phenyl) butane
and
1,4 - bis(trichloromethyl) - 2,3 - di(p - hydroxy-phenyl) butane.

The present novel group of symmetrical bis(trichloromethyl) diarylalkanes can undergo a variety of chemical transformations, which are useful in the prepartion of organic materials such as dyes, pharmaceuticals, etc.

The hydrogenation reaction of our invention is carried out by shaking a 1-trichloromethyl-2-bromo-2-arylalkane with hydrogen in the presence of both a hydrogenation catalyst, e. g., Raney nickel, platinum, palladium and their compounds, particularly their oxides, and a hydrogen halide acceptor, e. g., an alkali such as ammonia, sodium hydroxide, sodium acetate, and other compounds capable of neutralizing hydrogen bromide. The amount of the hydrogenation catalyst employed is not critical and quantities in the approximate range of 0.3-7.0 grams per mole of the 1-trichloromethyl-2-bromo-2-arylalkane have generally proven adequate. The amount of the hydrogen halide acceptor is preferably at least equivalent to the theoretical quantity of hydrobromic acid evolved during the reaction.

In the reaction the absorption of the theoretical quantity of hydrogen usually proceeds smoothly and rapidly at room temperature, i. e., ca. 25° C. and at atmospheric pressure. Hence, the use of elevated temperatures and superatmospheric pressures is usually unnecessary and may in fact prove economically undesirable.

The reaction is facilitated by an inert diluent such as water and unreactive organic solvents, particularly those capable of solubilizing the alkali, e. g., ethanol. The hydrogenation reaction frequently proceeds more rapidly in the presence of an organic diluent, but yields of the reaction product are often lower than from the corresponding reaction conducted in the presence of water.

At the end of the reaction, i. e., when approximately the theoretical amount of hydrogen has been absorbed, the organic components of the reaction mixture are extracted with a solvent such as benzene. The product is isolated from the extract by evaporation and is purified by recrystallization from appropriate solvents.

The following examples disclose our invention in more detail:

*Example 1*

To a mixture of 66 gms. of 1-trichloromethyl-2-bromo-2-(p-chlorophenyl) ethane, 100 mls. of petroleum ether (a commercial mixture consisting mainly of n-pentane, hexane and heptane) and 15 mls. of 15-N aqueous ammonia is added a pre-reduced suspension of 0.3 gm. of platinum oxide in 10 mls. of ethanol prepared by the conventional procedure described by Adams et al. in "Organic Syntheses," Coll. vol. I, by Gilman and Blatt. The mixture is enclosed in a vessel whose sole outlet is connected, through a flexible tube, to a source of hydrogen at atmospheric pressure and 25° C. The reaction mixture is then shaken vigorously for approximately 55 minutes during which time approximately 2620 mls. of hydrogen are absorbed.

The reaction mixture is then diluted with approximately 3 volumes of water and extracted with several portions of warm benzene. The extract is then filtered, dried and evaporated. The residue is recrystallized from petroleum ether to yield 11.2 gms. of 1,4-bis-trichloromethyl-2,3-bis(p-chlorophenyl)butane, M. Pt. 218–218.5° C.

Analysis—Found: Cl, 55.47%; theory, 55.2%.

*Example 2*

To a mixture of 90.1 gms. of 1-trichloromethyl-2-bromo-2-phenylethane, 75 mls. of absolute ethanol and 90 mls. of alcoholic ammonia (62 gms./liter of ethanol) is added a pre-reduced suspension of 0.3 gm. of platinum oxide in 10 mls. of ethanol. The mixture is shaken in an atmosphere of hydrogen at 25° C. for 40 minutes during which time approximately 4 liters of hydrogen are absorbed.

The reaction mixture is diluted with water and extracted with several portions of petroleum ether. The extract is filtered, dried and then evaporated to a solid residue. The latter is recrystallized from benzene to yield 13.6 gms. of 1,4-bis-trichloromethyl-2,3-diphenylbutane, M. Pt. 169.5–170° C.

Analysis—Found: Cl, 47.55%; theory, 47.80%.

The new products of the invention are convertible to the corresponding dicarboxylic acids

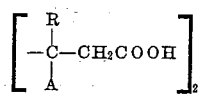

and their derivatives, by methods known to those skilled in the art, e. g., acidic hydrolysis. Such dicarboxylic acids are useful in the preparation of plasticizers and condensation polymers.

Having thus described our invention, what we claim and desire to protect by Letters Patent is:

1. 1,4 - bis(trichloromethyl) - 2,3-diarylbutanes of the formula $$Cl_3C-CH_2-C(R)(A)-C(R)(A)-CH_2-CCl_3$$

where R is a member from the class consisting of hydrogen and alkyl, and A is an aryl group.

2. 1,4 - bis(trichloromethyl) - 2,3 - diarylbutanes of the formula $$Cl_3C-CH_2-C(R)(A)-C(R)(A)-CH_2-CCl_3$$

where R is hydrogen, and A is an aryl group.

3. 1,4 - bis(trichloromethyl) - 2,3 - diarylbutanes of the formula $$Cl_3C-CH_2-C(R)(A)-C(R)(A)-CH_2-CCl_3$$

where R is an alkyl group, and A is an aryl group.

4. 1,4 - bis(trichloromethyl)-2,3 - diphenylbutane.

5. 1,4 - bis(trichloromethyl)-2,3 - di(p-chlorophenyl)butane.

6. 1,4 - bis(trichloromethyl-2,3-di(p-methoxyphenyl)butane.

ELBERT C. LADD.
HERBERT SARGENT.

REFERENCES CITED

The following references are of record in the file of this patent:

UNITED STATES PATENTS

| Number | Name | Date |
| --- | --- | --- |
| 2,346,000 | Barber | Apr. 4, 1944 |
| 2,346,049 | Rohrmann | Apr. 4, 1944 |
| 2,359,019 | Braker et al. | Sept. 26, 1944 |